Feb. 13, 1973 V. HACHENBURG 3,716,728

MINIMUM DELAY DATA TRANSFER ARRANGEMENT

Filed Oct. 12, 1970 2 Sheets-Sheet 1

INVENTOR
V. HACHENBURG
BY R. B. Ardis
ATTORNEY

United States Patent Office 3,716,728
Patented Feb. 13, 1973

3,716,728

MINIMUM DELAY DATA TRANSFER ARRANGEMENT

Victor Hachenburg, Naperville, Ill., assignor to Bell Telephone Laboratories, Incorporated, Murray Hill and Berkeley Heights, N.J.

Filed Oct. 12, 1970, Ser. No. 79,976
Int. Cl. G11c *19/00;* H03k *3/286*
U.S. Cl. 307—291 5 Claims

ABSTRACT OF THE DISCLOSURE

A register structure for a data processor comprising a plurality of multibit flip-flop registers interconnected by means of a data transfer bus is disclosed. The bus comprises a plurality of individual conductors, each individual conductor interconnecting flip-flops similarly situated in each of the plurality of registers. An input gating arrangement for gating data into the flip-flops provides for a transfer of data with minimum delay.

BACKGROUND OF THE INVENTION

This invention relates to a register structure for data processing machines and more particularly to circuitry for transferring data between registers with minimum delay.

It is generally not disputed that in program controlled processors execution time is at a premium and that it is advantageous to perform data processing operations within the shortest possible time. It is well known that data may be selectively transferred from any of a plurality of registers to any other register by means of an interconnecting data bus which comprises a plurality of individual conductors. Furthermore, it is known that by the use of the proper gate circuits a single wire conductor may interconnect the output terminals of a plurality of register output gates and the input terminals of a plurality of input gates. In such a structure, transfer of data generally takes place by selectively enabling the output gate of a source register and the input gate of a destination register.

It is commercially advantageous to use one type of logic circuits (e.g., NAND logic) exclusively throughout a processor. However, certain problems arise through the exclusive use of one logic circuit which do not arise by the use of certain other logic circuits. When using NAND logic throughout, it must be recognized that the output produced by a NAND logic gate in its disabled state is a logical "1." Thus, when using NAND logic circuits in the data transfer arrangement described in the previous paragraph, a bus conductor presents a logical "1" to all input gates to which it is connected when none of the output gates connected to the bus is enabled. To transfer data from one register to another in the shortest period of time is advantageous to simultaneously enable a selected source register output gate connected to a bus conductor and a selected destination register input gate. However, since the bus conductor normally presents a logical "1," erroneous data may be entered in the destination flip-flop if, because of variations in logic circuit delays, the input gate becomes enabled a few nanoseconds before the selected output gate is activated. The same problem occurs if the input gate remains enabled after the selected output gate is deactivated. The gating of erroneous data into a receiving flip-flop may be avoided by inserting an inverter gate in the bus connecting circuit or by enabling the input gate of the receiving register a fixed period of time after the enabling of the output gate of the source register. Both of these solutions introduce time delays, which is undesirable.

It is an object of this invention to provide an arrangement for transferring data from a first flip-flop register to a second flip-flop register with a minimum of time delay.

SUMMARY OF THE INVENTION

In accordance with this invention, the selective transfer of binary data between a plurality of flip-flop registers is accomplished by interconnecting, by means of a single wire conductor, output gates of a plurality of source register flip-flops with set input terminals of a plurality of destination flip-flops, and by the use of control gates individually associated with the destination flip-flops. When data is to be transferred from a selected source register to a selected destination register, the output gates of the selected source register are enabled by an output enable pulse and the control gates of the selected destination register are enabled by an input enabling pulse. The input enable pulse may be derived from a clock pulse which clock pulse also generates the output enabling pulse. Consequently, the two enable pulses have approximately the same starting point in time thereby avoiding the time delay which is introduced when one pulse must precede the other. The control gates prevent the flip-flops from responding to data applied to the set terminals until enabled by the input enable pulse.

In one embodiment of my invention, the control gate comprises a NAND gate designed to operate in conjunction with a NAND flip-flop and after the flip-flop is placed in the reset state, the control gate serves to keep it in the reset state until enabled by the input enable pulse. The flip-flop can be set only when data in the form of logical "0" appears on the bus conductor during the period of time that the control gate is enabled. Consequently, the order of appearance or disappearance of the data and enable pulses is not significant as long as there is a minimum period of overlap between the pulses.

DETAILED DESCRIPTION

Figure 1:
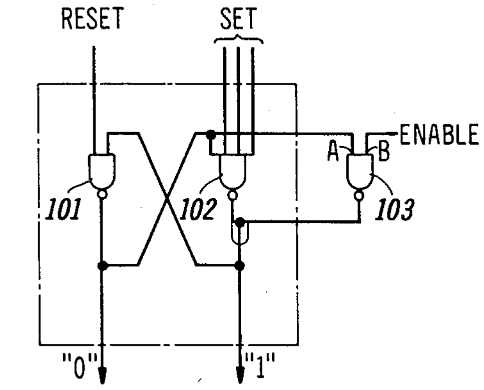
FIG. 1 is a symbolic representation of a NAND gate flip-flop having a control gate connected in parallel with one of the NAND gates of the flip-flop.

FIG. 1 shows NAND gates 101 and 102 connected in a flip-flop configuration. One input terminal of NAND gate 101 comprises the reset terminal of the flip-flop and a low going pulse (logical "0") applied to the reset terminal causes the output of NAND gate 101 to go to a high voltage level (logical "1") and, in the absence of any logical "0's" applied to the set terminals of the flip-flop, causes the output of NAND gate 102 to go to a near zero voltage level (logical "0"). Once having been placed in the reset state the flip-flop retains this state until the appropriate set signals are applied. The reset state of the illustrative flip-flop is defined as a logical "1" at the output of NAND gate 101 and logical "0" at the output of NAND gate 102, and the set state is the converse thereof. As shown in FIG. 1, a two-input NAND gate 103 is connected in parallel with flip-flop gate 102. One input terminal of NAND gate 103 is connected to the output terminal of NAND gate 101, which is the "0" output of the flip-flop. The other input terminal of NAND gate 103 is connected to an ENABLE conductor which applies a negative going pulse when activated. The output terminals of NAND gates 102 and 103 are connected together, in the manner shown in FIG.

2B, and their combined output represents logical "0" whenever logical "1" is presented to all the input terminals of NAND gate 102 or to the input terminals of NAND gate 103 or to all input terminals of both of these gates.

As mentioned earlier, it is desirable to gate information into the flip-flop simultaneously with appearance of data on a data bus to which the flip-flop is connected. The flip-flop of FIG. 1 may be connected to several data bus conductors, each bus conductor being connected to one of the input terminals of NAND gate 102. It is understood that the number of data bus conductors connected to NAND gate 102 is not material to the concept being taught herein. When the flip-flop is in the reset state, as discussed in the prior paragraph, the input terminal of NAND gate 103 connected to the "0" side of the flip-flop will represent a logical "1." The state of the ENABLE conductor is a logical "1" prior to the occurrence of an enable pulse thereon. Consequently, the output of NAND gate 103 is "0" causing the combined output of gates 102 and 103, which is the "1" output terminal of the flip-flop, to be "0" independent of the data applied to the SET terminals of the flip-flop. In case data in the form of a logical "0" is applied on one of the SET terminals of the flip-flop before an enable pulse occurs on the ENABLE conductor, the combined output of NAND gates 102 and 103 will remain unchanged. However, the occurrence of an enable pulse in the form of a logical "0," during the continued presence of a logical "0" applied to one of the SET terminals, causes the combined output of NAND gates 102 and 103 to change to logical "1." This "1" is presented to one of the input terminals of NAND gate 101, the other input terminal being the RESET terminal which normally presents a logical "1" to the NAND gate 101. As a consequence of two logical "1's" being applied to the inputs of NAND gate 101, the output terminal of this last named gate assumes the logical "0" state and the logical "0" is applied to input terminals of NAND gates 102 and 103. As a result of this applied logical "0," the combined output of the two last named gates will retain the logical "1" state even after the data and the enable pulse have disappeared.

Assuming again that the flip-flop is in the reset state, consider the case in which the timing is such that the enable pulse is applied to NAND gate 103 before any data in the form of logical "0" is applied to NAND gate 102. The combined output of the NAND gates 102 and 103 does not change from the presence of the enable pulse alone; however, it will change as soon as data in the form of logical "0" has been applied to NAND gate 102 and has propagated through this gate. The flip-flop will change state as explained above. Thus, the flip-flop changes state as soon as the data is applied to it. It is clear that no change of state will take place if no data in the form of logical "0" is applied to the flip-flop during the period that the enable pulse is applied thereto. It can be seen from the above explanation that the flip-flop will change from the reset to the set state as long as there is some minimum period of overlap between data applied to the flip-flop and the enable pulse. The result will be the same independent of whether the data or the enable pulse appears first in time.

Figure 3:
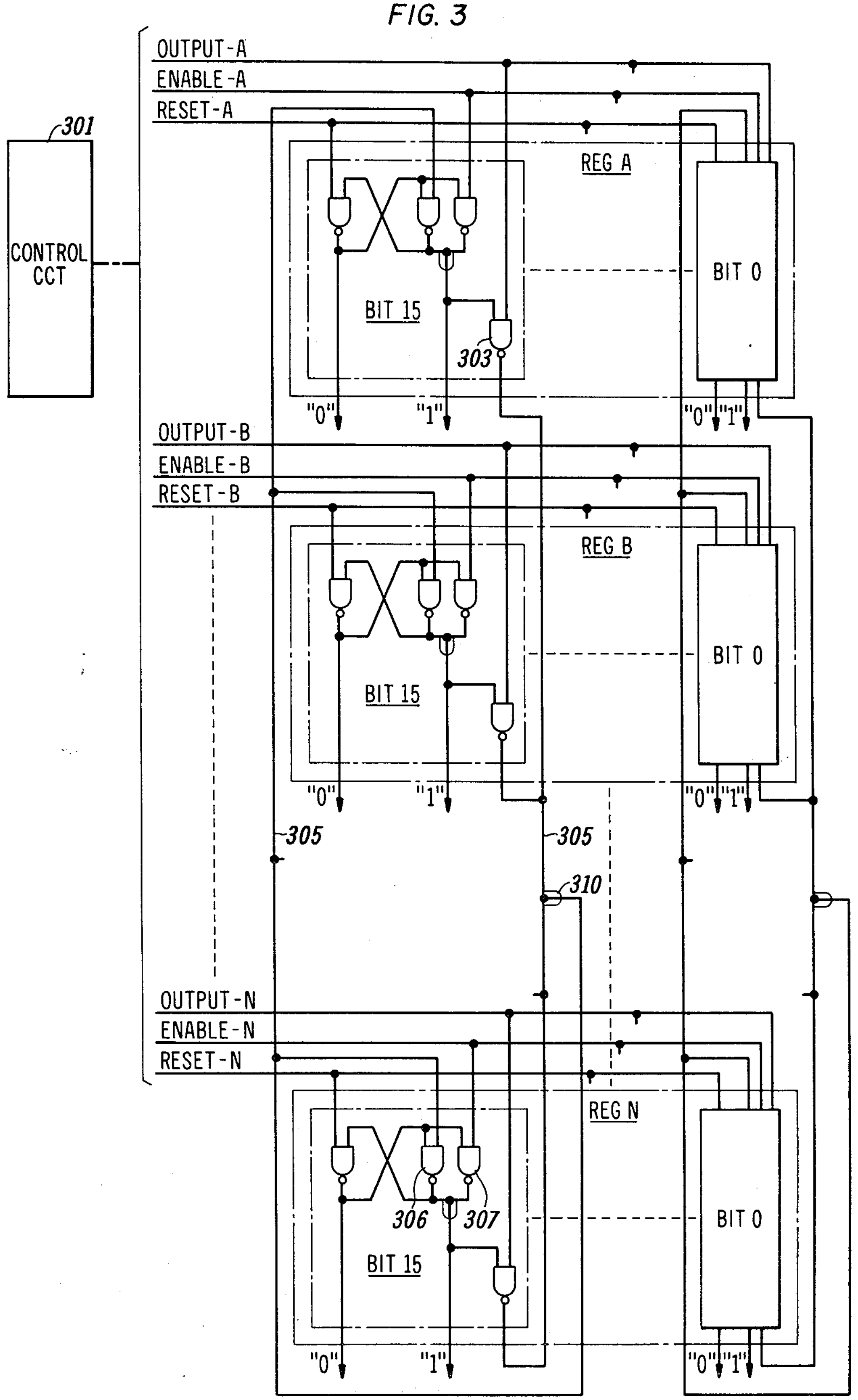
FIG. 3 shows a plurality of multibit registers having like numbered bits connected by means of a single conductor data bus.

FIG. 3 shows a register arrangement comprising registers A through N. Each register comprises 16 bits labeled bit 0 through bit 15. Each bit of the register consists of a flip-flop of the type shown in FIG. 1, including the control gate, and an output gate. A bus conductor 305 is shown as interconnecting the output terminals and input terminals of bit 15 of each of the registers 1 through N. The register arrangement shown is intended for the parallel transfer of data from any of the registers of the group A through N to any other register of that group. Individually associated with each register is a RESET conductor which is employed to simultaneously reset all of the bits of the register to which it is connected, a conductor labeled OUTPUT for controlling the gating of data from the register, and an ENABLE conductor for controlling the gating of data into the register.

Figure 2A:
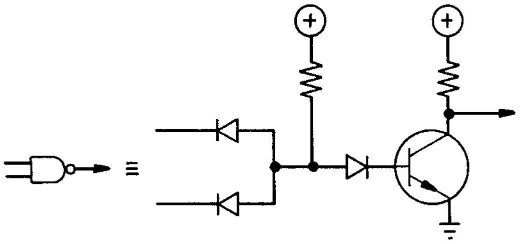
FIGS. 2A and 2B are schematic representations defining the logic symbols employed in the drawing.
Figure 2B:
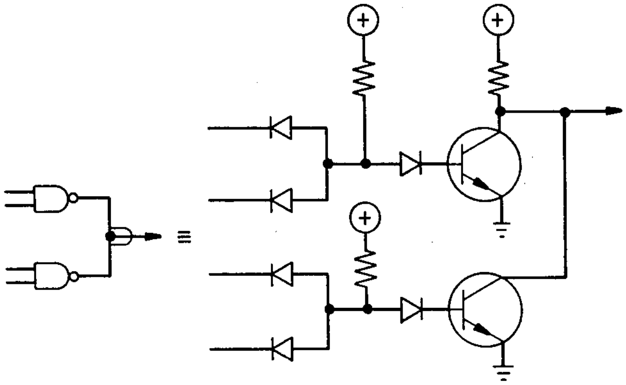

As an example of the operation of this arrangement, consider that data is to be gated from register A to register N. In anticipation of the transfer of data, the control circuit 301 generates a reset pulse on the RESET–N conductor during a first time period thereby resetting all the bits of register N. During a succeeding time period the control circuit simultaneously generates an enable pulse on the conductor OUTPUT–A, to gate the data from register A, and on conductor ENABLE–N to gate the data into register N. Assuming for the sake of illustration that bit 15 of register A contains a logical "1," the transfer of this data bit to register N will be as follows. The output gate 303 of bit 15 of register A is enabled by the pulse on the conductor OUTPUT–A, and since the flip-flop is in the "1" state, activation of gate 303 causes the data bus conductor 305 to assume the logical "0" state. The symbol 310 simply represents the interconnection of all the outputs of the output gates of the various bits 15 of registers A through N. The circuit representation of this symbol is shown in FIG. 2B. Since the output of the output gate 303 is directly connected to gate 306 of bit 15 of register N, not time delay is introduced in the data transfer path other than that introduced by gate 303 and the transmission delay on conductor 305. Gate 307 is activated by an enable pulse on conductor ENABLE–N contemporaneously with the activation of gate 303 and the combined output of gates 306 and 307 will assume the logical "1" state after the data and the enable pulse have propagated through gates 306 and 307, respectively.

Advantageously, as shown herein, data may be selectively transferred from a first register to any of a plurality of other registers by gating pulses generated from a common clock pulse. The only delay that is introduced between the flip-flop of the source register and the flip-flop of the sink register is that introduced by the output gate of the source flip-flop and the conductor interconnecting this output gate with the destination flip-flop. It is to be understood that the above-described arrangement is merely illustrative of the application of the principles of my invention and that other arrangements may be devised by those skilled in the art without departing from the spirit and scope of my invention.

What is claimed is:

1. A flip-flop arrangement comprising:

first and second circuit means, an output terminal of said first circuit means being connected to an input terminal of said second circuit means and an output terminal of said second circuit means being connected to an input terminal of said first circuit means; and third circuit means having an input terminal connected to said output terminal of said first circuit means, a control input terminal, and an output terminal connected to said output terminal of said second circuit means;

said third circuit means being responsive to control signals appearing on said control input terminal to selectively prevent and allow said flip-flop arrangement to respond to signals applied to another input terminal of said second circuit means.

2. A flip-flop arrangement comprising:

first and second NAND circuits each having input terminals and an output terminal, the output terminal of said first NAND circuit being connected to a first input terminal of said second NAND circuit and the output terminal of said second NAND circuit being connected to an input terminal of said first NAND circuit; and a third NAND circuit having an input terminal connected to the output terminal of said first NAND circuit, having an output terminal connected to the output terminal of said second NAND circuit, and having a first control input terminal, said third NAND circuit being responsive to control signals applied to said first control input terminal to selectively prevent and allow said flip-flop arrangement to respond to signals applied to a second input terminal of said second NAND circuit.

3. The flip-flop arrangement of claim 2 further comprising:

fourth and fifth NAND circuits each comprising input terminals and output terminals;

the output terminal of said fourth NAND circuit being connected to an input terminal of said fifth NAND circuit; and the output terminal of said fifth NAND circuit being connected to an input terminal of said fourth NAND circuit; and a sixth NAND circuit comprising an input terminal connected to the output terminal of said fourth NAND circuit, an output terminal connected to said second input terminal of said second NAND circuit, and a second control input terminal;

said sixth NAND circuit being responsive to signals applied to said second control input terminal to transmit the logical inversion of signals appearing at the output terminal of said fourth NAND circuit to said second input terminal of said second NAND circuit.

4. A flip-flop arrangement having first and second stable states and comprising first, second, and third NAND circuits, each of said NAND circuits comprising at least two input terminals and one output terminal;

each of said NAND circuits being responsive to the application of a signal representing a logical "0" to any of its input terminals to generate a signal representative of a logical "1" on its output terminal, and responsive to the concurrent application of signals representative of logical "1" to all of its input terminals to generate a signal representative of logical "0" at its output terminal;

the output terminal of said first NAND circuit being connected to an input terminal of said second NAND circuit and to an input terminal of said third NAND circuit, the output terminal of said second NAND circuit being connected to a first input terminal of said first NAND circuit, and to the output terminal of said third NAND circuit;

said flip-flop arrangement being responsive to the application of a signal representative of logical "0" to another input terminal of said first NAND circuit to change from said first to said second stable state and responsive to the concurrent application of signals representative of the logical "0" to another input terminal of said second NAND circuit and another input terminal of said third NAND circuit to change from said second to said first stable state.

5. A flip-flop arrangement comprising:

a first NAND flip-flop comprising a first "1" output terminal;

a second NAND flip-flop comprising a set input terminal, a "0" output terminal and a second "1" output terminal;

a first NAND gate comprising an input terminal connected to said first "1' output terminal, an output terminal connected to said set input terminal and a first control input terminal; and a second NAND gate comprising an input terminal connected to said "0" output terminal, an output terminal connected to said second "1" output terminal and a second control input terminal.

References Cited

UNITED STATES PATENTS

| | | | |
|---|---|---|---|
| 3,031,587 | 4/1962 | Ord et al. | 307—247 R |
| 3,480,801 | 11/1969 | Smith | 307—215 X |

FOREIGN PATENTS

| | | | |
|---|---|---|---|
| 1,096,837 | 12/1967 | Great Britain | 307–215 |

J. ZAZWORSKY, Primary Examiner

U.S. Cl. X.R.

307—215, 221, 289; 328—93

Dedication

3,716,728.—*Victor Hachenburg*, Naperville, Ill. MINIMUM DELAY DATA TRANSFER ARRANGEMENT. Patent dated Feb. 13, 1973. Dedication filed Feb. 15, 1978, by the assignee, *Bell Telephone Laboratories, Incorporated.*

Hereby dedicates to the Public the entire remaining term of said patent.

[*Official Gazette September 30, 1980.*]